United States Patent
Kolatschek et al.

(10) Patent No.: US 9,061,653 B2
(45) Date of Patent: Jun. 23, 2015

(54) METHOD AND DEVICE FOR CONTROLLING THE FILLING OF AN AIRBAG FOR A VEHICLE AND AN AIRBAG SYSTEM

(71) Applicants: Josef Kolatschek, Weil Der Stadt (DE); Heiko Freienstein, Weil Der Stadt (DE); Gian Antonio D'Addetta, Stuttgart (DE)

(72) Inventors: Josef Kolatschek, Weil Der Stadt (DE); Heiko Freienstein, Weil Der Stadt (DE); Gian Antonio D'Addetta, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/462,182

(22) Filed: Aug. 18, 2014

(65) Prior Publication Data

US 2015/0054269 A1 Feb. 26, 2015

(30) Foreign Application Priority Data

Aug. 21, 2013 (DE) .......................... 10 2013 216 583

(51) Int. Cl.
  *B60R 21/263* (2011.01)
  *B60R 21/268* (2011.01)
  *B60R 21/017* (2006.01)
  *B60R 21/01* (2006.01)
  *B60R 21/26* (2011.01)

(52) U.S. Cl.
  CPC ............. *B60R 21/263* (2013.01); *B60R 21/017* (2013.01); *B60R 2021/01231* (2013.01); *B60R 21/268* (2013.01); *B60R 2021/01225* (2013.01); *B60R 2021/26094* (2013.01); *B60R 2021/2633* (2013.01)

(58) Field of Classification Search
  CPC .. B60R 21/017; B60R 21/263; B60R 21/268; B60R 2021/01231; B60R 21/01225; B60R 21/26094; B60R 21/2633
  See application file for complete search history.

(56) References Cited

U.S. PATENT DOCUMENTS

| | | | | |
|---|---|---|---|---|
| 5,927,753 | A * | 7/1999 | Faigle et al. | 280/735 |
| 5,957,490 | A * | 9/1999 | Sinnhuber | 280/735 |
| 7,748,737 | B2 * | 7/2010 | Hall et al. | 280/736 |
| 2001/0035643 | A1 * | 11/2001 | Mueller | 280/806 |
| 2002/0041090 | A1 * | 4/2002 | Wohllebe et al. | 280/736 |
| 2004/0135356 | A1 * | 7/2004 | Katsuda et al. | 280/739 |
| 2005/0161921 | A1 * | 7/2005 | Higuchi | 280/735 |
| 2006/0290120 | A1 * | 12/2006 | Zeng et al. | 280/742 |
| 2008/0172157 | A1 * | 7/2008 | Hall et al. | 701/45 |
| 2009/0200777 | A1 * | 8/2009 | Webber et al. | 280/735 |
| 2010/0213694 | A1 * | 8/2010 | Kalliske et al. | 280/741 |
| 2012/0038139 | A1 * | 2/2012 | Borg et al. | 280/741 |
| 2014/0326320 | A1 * | 11/2014 | Wellhoefer et al. | 137/1 |

* cited by examiner

*Primary Examiner* — Drew Brown
(74) *Attorney, Agent, or Firm* — Kenyon & Kenyon LLP

(57) ABSTRACT

A method for controlling the filling of an airbag for a vehicle includes closing a valve of a gas generator for the airbag, this valve being connected to an interface to a gas sack of the airbag, after a main volume of a gas has flowed out of the gas generator, through the valve into the gas sack in a first gas mass flow, and opening the valve to direct a residual volume of gas out of the gas generator, through the valve into the gas sack in a second gas mass flow, the second gas mass flow being smaller than the first gas mass flow.

8 Claims, 2 Drawing Sheets

METHOD AND DEVICE FOR CONTROLLING THE FILLING OF AN AIRBAG FOR A VEHICLE AND AN AIRBAG SYSTEM

RELATED APPLICATION INFORMATION

The present application claims priority to and the benefit of German patent application no. 10 2013 216 583.8, which was filed in Germany on Aug. 21, 2013, the disclosure of which is incorporated herein by reference.

FIELD OF THE INVENTION

The present invention relates to a method for controlling the filling of an airbag for a vehicle, to a corresponding device, to an airbag system for protecting an occupant of a vehicle in the event of a collision of the vehicle, and to a corresponding computer program product.

BACKGROUND INFORMATION

Typical pyrotechnic airbag systems are used in almost all modern vehicles. The actual bag, which cushions the occupant of the vehicle in the event of a crash, is filled with hot gas. This gas is formed by a combustion reaction of material in tablet form in the so-called gas generator.

The inflation process depends on the chemical properties and the geometry—essentially the surface area—of the material. Airbags may be adjusted "adaptively" by igniting a second charge of the material and/or opening a valve in the bag or in the generator, so that gas escapes or is not even directed into the bag.

Alternatively, cold gas airbags, which fill the bag with a gas from a pressurized volume, may be used.

There are also hybrid systems using cold gas and pyrotechnic components.

SUMMARY OF THE INVENTION

Against this background the present invention presents a method for controlling the filling of an airbag of a vehicle, a device which uses this method and also an airbag system for protecting an occupant of a vehicle in the event of a collision of the vehicle and, finally, a corresponding computer program product according to the main claims. Advantageous embodiments are derived from the corresponding subclaims and the description which follows.

A gas volume of the airbag and of the generator may be controlled by a valve, which is connected to a cold gas generator of an airbag and may be opened and closed to advantageously improve a protective function of the airbag. Such a valve may be used in the same way on a pyrotechnic or hybrid airbag system if suitable pressure-storing equipment is available.

The concept presented here allows comparatively small outlet openings since excessively high pressures do not even occur due to the precision modeling of the gas mass flow.

According to the approach presented here, a residual gas volume, which is present after a crash and which results from efficient and adapted handling of the gas from the cold gas generator or from some other pressure storage in combination with the small outlet openings and the minor losses due to a low permeability of the airbag material, may be used advantageously for a prolonged protective effect for the occupant.

A gas generator is therefore capable of modeling a protective functionality not only during a primary collision but also thereafter. This is particularly important in view of the fact that there is a high probability of one or more additional collisions following a primary collision or of the input of impacts via the chassis—for example, when leaving the road. According to the concept presented here, the occupant, who may be injured in the first collision or even more injured thereafter, may be protected by an advantageous additional air cushion. The ride-down space, which is required for dissipation of the occupant's kinetic energy, also known as the survival space, may be utilized optimally with such an adaptively controlled air cushion.

A method for controlling the filling of an airbag for a vehicle has the following steps:
   closing a valve of a gas generator for the airbag situated at an interface to a gas sack of the airbag after a main volume of a gas has flowed out of the gas generator, through the valve and into the gas sack in a first gas mass flow; and
   opening the valve to allow a residual volume of gas to flow out of the gas generator, through the valve and into the gas sack in a second gas mass flow, the second gas mass flow being smaller than the first gas mass flow.

The step of opening the valve may be carried out several times in chronological succession. Between two successive valve-opening procedures, the valve may be closed either completely or partially each time. The second gas mass flow may thus be a pulsed gas mass flow, which is smaller on the average than the first gas mass flow. It is therefore also possible to open and close the valve repeatedly. This has the advantage that a certain average gas flow rate may be maintained over a longer period of time.

The main volume may be larger than the residual volume. Thus, on the whole, a mass flowing into the gas sack due to the first gas mass flow may be greater than the total mass flowing into the gas sack due to the second gas mass flow. Furthermore, a smaller mass may flow into the gas sack per unit of time during the second gas mass flow than during the first gas mass flow.

The control in terms of the method may relate in particular to a supply of gas out of the gas generator into the gas sack. The gas generator may be a container in which cold gas under pressure is stored, so that the gas may flow out of the container, through the open valve and into the gas sack connected to the container. The valve may be a cutoff valve, which is configured to allow or to stop a gas flow out of the gas generator and into the gas sack and to set a variable of a volume flow of the gas.

In particular the main volume may be of a greater extent than the residual volume of gas. The gas mass flow may represent one variable of a gas volume, which flows out of the gas generator and into the gas sack in a predetermined period of time, depending on a predetermined opening cross section of the valve. The gas sack may be inflated faster and more extensively, the greater the gas mass flow. The gas sack may be made of a suitable, which may be gastight plastic material and have a plurality of small outlet openings. The main volume of gas introduced into the gas sack in the first gas mass flow may again escape at least partially from the gas sack through these outlet openings, based on a pressure increase due to the contact of a body of an occupant of the vehicle who is to be protected before the residual gas volume, as the second gas mass flow, is able to flow into the gas sack and unfurl it again gently and partially before the opening of the valve according to the present invention.

According to one specific embodiment of the method, the closing step may be carried out on the basis of a first sensor signal, which represents a first filling state of the gas sack. The opening step may be carried out based on a second sensor signal, which represents a second filling state of the gas sack. In the first filling state, the gas sack may be adequately filled with the gas to receive and support an occupant's body in the event of a collision of the vehicle.

In the second filling state, the gas sack may be emptied through an outflow of gas out of outlet openings in the gas sack due to the occupant's body being in contact with the gas sack to the extent that introduction of the residual volume of gas to create a "ride-down space" is indicated. In a simple embodiment, the first and second sensor signals may advantageously be supplied by different sensors. In conjunction with sensing a filling state of a gas sack of the airbag, an optimal adaptation of the airbag pressure and thus the restraining force to the crash and to the occupant or an at-risk person may be made possible through this fully adaptive airbag control strategy.

The method may therefore include a step of ascertaining a first gas pressure prevailing in the gas sack in order to generate the first sensor signal. Furthermore, the method may include a step of ascertaining a second gas pressure 210 prevailing in the gas sack in order to generate the second sensor signal. An indirect sensing may be carried out as an alternative option for sensing the filling state directly. On the one hand, it is possible to directly infer, from the duration of the valve opening time, for example, the filling state of the gas sack by using a table created previously in experiments. On the other hand, the pressure in the gas container may also be measured and the quantity of gas flowing out and thus in turn the filling state of the gas sack may be inferred from the drop in pressure. The quality of an indirect measurement may be further improved by including individual occupant characteristics, such as the seat position, weight, height, etc.

In the step of opening the valve in particular, directing the residual volume of gas into the gas sack may result in an increase in a depth of the gas sack in a range between 5 cm and 10 cm. It is thus easily possible to create a so-called ride-down space with an additional air cushion after the actual collision in order to better protect the occupant from collision-related injuries, in particular for a longer period of time.

A device for controlling the filling of an airbag for a vehicle has the following features:
- a closing mechanism for closing a valve of a gas generator for the airbag situated on an interface to a gas sack of the airbag, after a main volume of a gas has flowed out of the gas generator, through the valve and into the gas sack in a first gas mass flow; and
- an opening mechanism for opening the valve to direct a residual volume of gas out of the gas generator, through the valve and into the gas sack in a second gas mass flow, this second gas mass flow being smaller than the first gas mass flow.

The device may be configured to carry out or implement the steps of the method according to the present invention in its corresponding equipment units. The object on which the present invention is based may also be achieved rapidly and efficiently through this embodiment variant of the present invention in the form of a device.

A device here may be understood to be an electrical device which processes sensor signals and outputs control signals and/or data signals as a function thereof. The device may have an interface, which may be configured in hardware and/or software. In a hardware configuration, the interfaces may be part of a so-called system-ASIC, for example, which includes a wide variety of functions of the device. However it is also possible for the interfaces to be separate integrated circuits or to include discrete components at least in part. In a software configuration, the interfaces may be software modules, which are present on a microcontroller in addition to other software modules, for example.

An airbag system for a vehicle for protecting an occupant or a person in the event of a collision of the vehicle has the following features:
- an airbag which has a gas sack and a gas generator; and
- a device for controlling the filling of an airbag of a vehicle, the device being connected to the gas generator of the airbag.

The airbag, the sensor unit and the device may be interconnected via a bus system, for example. The sensor unit may be configured to detect a first filling state of the gas sack, in which it has a filling suitable for providing direct collision protection for an occupant of the vehicle. Furthermore, the sensor unit may be configured to detect a second filling state of the gas sack in which it has already emptied itself in the course of the collision and may be filled with the residual volume to form the ride-down space.

The airbag system may have a sensor unit connected to the gas sack configured to supply to the device a first sensor signal, which represents a first filling state of the gas sack, and a second sensor signal, which represents a second filling state of the gas sack.

Also advantageous is a computer program product having program code, which may be stored on a machine-readable carrier, such as a semiconductor memory, a hard drive memory or an optical memory, and is used for carrying out the method according to one of the specific embodiments described above when the program product is executed on a computer or a device.

The present invention is explained in greater detail below on the basis of the accompanying drawings as examples.

DETAILED DESCRIPTION

Figure 1:
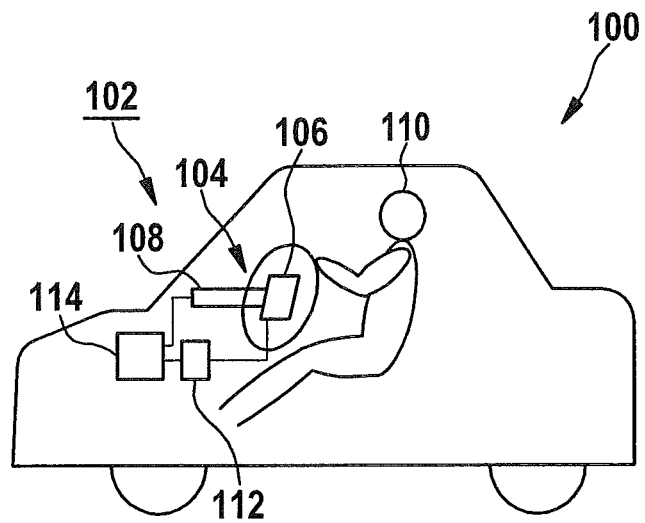
FIG. 1 shows a schematic diagram of an airbag system for a vehicle according to one exemplary embodiment of the present invention.

In the following description of exemplary embodiments of the present invention, the same or similar reference numerals are used for elements which are depicted in the various figures and have similar actions, so that a repeated description of these elements is omitted.

FIG. 1 shows an exemplary embodiment of an airbag system for protecting an occupant of a vehicle in the event of a collision of the vehicle. This shows a vehicle 100, in which an airbag system 102 according to the present invention has been installed. Airbag system 102 includes an airbag 104, which has a gas sack 106 and a gas generator 108. Airbag 104 is configured here as a front airbag and is therefore situated in a front compartment area of vehicle 100 to protect an occupant 110—a driver here—of vehicle 100 from injuries in the head and chest areas in particular in the event of a collision.

If one considers the situation after a frontal crash, it is likely that, after the crash, occupant 110 will be in contact with the steering wheel or dashboard of vehicle 100 or will have been drastically displaced forward out of the optimal position. The important thing here is to protect occupant 110 from any danger of injury at this time or any exacerbation of pre-existing injuries.

No collision has yet taken place in the vehicular scene shown in FIG. 1, and gas sack 106, which is installed in the steering wheel of vehicle 100, is folded up in a compartment at the center of the steering wheel provided for gas sack 106. Gas sack 106 is made of a plastic material having a low permeability and is connected to gas generator 108. Gas generator 108 here is a cold gas generator, in which a gas for filling gas sack 106 is stored under pressure. A valve (not shown in the diagram in FIG. 1) prevents gas from being able to penetrate into gas sack 106 from cold gas generator 108 in the collision-free condition of vehicle 100. A sensor unit 112 is connected with the aid of suitable lines to gas sack 106 to ascertain a filling state of gas sack 106.

Airbag system 102 also includes a device 114 for controlling airbag 104, which is connected via suitable interfaces to sensor unit 112 and to gas generator 108. Device 114 is configured to control the filling of gas sack 106 with gas by suitable triggering of the valve of the gas generator, based on a sensor signal received from sensor unit 112.

Figure 2A:
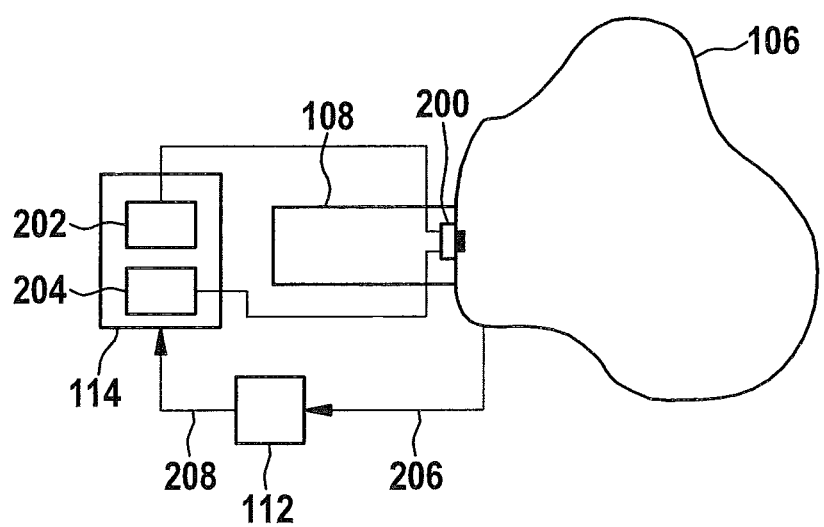
FIG. 2A shows a schematic diagram of a first operating mode of the device from FIG. 1.
Figure 2B:
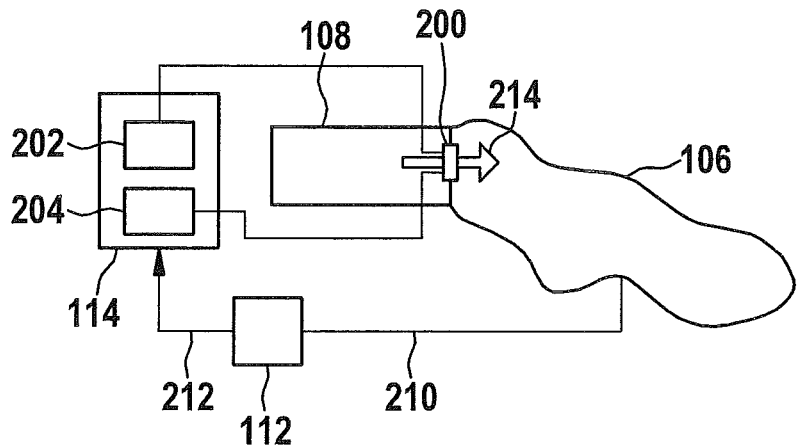
FIG. 2B shows a schematic diagram of a second operating mode of the device from FIG. 1.

FIGS. 2A and 2B show device 114 for controlling an airbag of a vehicle in a detailed form to illustrate and explain the operating mode of the "post-crash ride-down-ability" of cold gas generator airbag system 102 from FIG. 1.

FIG. 2A illustrates a first operating mode of device 114 on the basis of a greatly simplified schematic diagram. The diagram in FIG. 2A shows a situation after a collision of the vehicle shown in FIG. 1. The airbag has deployed and a main volume of gas stored in gas generator 108 has flowed into gas sack 106 through a valve 200 connecting gas sack 106 to gas generator 108 and has inflated it to cushion and delay a collision-induced forward movement of the occupants. As shown in the diagram in FIG. 2A, device 114 includes a closing mechanism 202 and an opening mechanism 204, which are connected to valve 200 via a suitable line system. A cutoff valve is shown here as the example of valve 200. Other forms of valves may also be used to control and/or regulate a gas mass flow.

As shown by the diagram in FIG. 2A, gas sack 106 has achieved a high degree of filling since a main volume of gas has flowed out of gas generator 108 into the gas sack. Sensor unit 112 detects a first gas pressure 206 prevailing in gas sack 106 and sends a first sensor signal 208, which represents the high degree of filling of gas sack 106, as a first filling state of the gas sack, to device 114 via a suitable interface. Based on first sensor signal 208, closing mechanism 202 causes valve 200 to close, as illustrated in the diagram in FIG. 2A. When valve 200 is closed, a gas flow out of gas generator 108 into gas sack 106 is interrupted, so that a residual volume of gas remains in gas generator 108.

FIG. 2B illustrates a second operating mode of device 114 on the basis of another highly simplified schematic diagram. This diagram shows gas sack 106 at a later point in time after a collision has occurred. Most of the main volume of gas has flowed out of gas generator 108 into gas sack 106 through a plurality of outlet openings provided in the gas sack due to the contact of the occupant with gas sack 106 as a result of the collision, and gas sack 106 is at least partially deflated. Sensor unit 112 detects a second gas pressure 210 prevailing in gas sack 106 and sends a second sensor signal 212, which represents the low degree of filling of gas sack 106 shown in the diagram in FIG. 2B, as a second filling state of the gas sack, to device 114 via the interface.

Based on second sensor signal 212, opening mechanism 204 causes valve 200 to open. As shown in the diagram in FIG. 2B, the residual gas volume initially retained in gas generator 108 may flow out of gas generator 108 into gas sack 106 in a second gas mass flow 214, which is indicated by an arrow in the diagram, in order to partially inflate this gas sack again to form the ride-down space according to the present invention, i.e., a form of another air cushion.

If the crash has already occurred and the entire gas volume in generator 108 has not been emptied, then the residual volume may be blown cautiously into gas sack 106. The bag, i.e., gas sack 106, is filled 214 with the residual volume of an appropriate and less aggressive gas flow out of gas generator 108. The occupant is cautiously displaced from the geometric limit of the passenger compartment.

The slow filling of gas sack 106 after the primary crash creates an air cushion, which includes an additional ride-down space of 5 cm to 10 cm and brings the occupant into a safer position with a relatively minor application of force.

Figure 3:
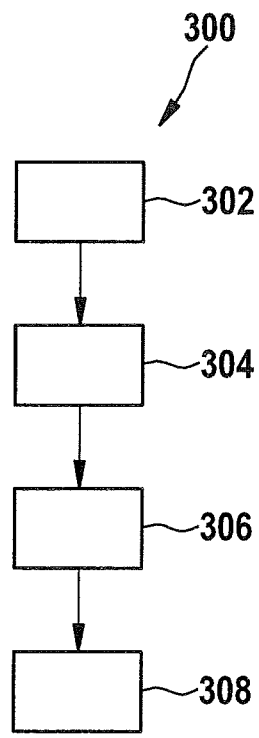
FIG. 3 shows a flow chart of a method for controlling an airbag of a vehicle according to one exemplary embodiment of the present invention.

FIG. 3 shows a flow chart of one exemplary embodiment of a method 300 for controlling an airbag of a vehicle. A first sensor signal, which represents a first (high) filling state of a gas sack of an airbag, is input in a step 302. Based on the first sensor signal, a valve of a gas generator of the airbag connected to the gas sack of the airbag is closed in a step 304 to enclose a residual volume of a gas supply in the gas generator. In a step 306, a second sensor signal, which represents a second (low) filling state of the gas sack, is input. Based on the second sensor signal, the valve of the gas generator connected to the gas sack is opened in a step 308 to direct the residual volume of gas into the gas sack and to cause an increase in the height of the gas sack to form a ride-down space.

The exemplary embodiments shown in the figures and described here have been selected only as examples. Various exemplary embodiments may be combined with one another completely or with respect to individual features. One exemplary embodiment may also be supplemented by features of another exemplary embodiment.

Furthermore, method steps according to the present invention may be repeated and carried out in a sequence different from the sequence described here.

If one exemplary embodiment includes an "and/or" link between a first feature and a second feature, this should be interpreted to mean that according to a first specific embodiment, the exemplary embodiment has both the first feature and the second feature, and according to another specific embodiment, it has either only the first feature or only the second feature.

What is claimed is:

1. A method for controlling a filling of an airbag for a vehicle, the method comprising:
   closing a valve of a gas generator for the airbag, the valve being situated at an interface to a gas sack of the airbag after a main volume of gas has flowed out of the gas generator, through the valve into the gas sack in a first gas mass flow; and
   opening the valve to direct a residual volume of gas out of the gas generator, through the valve into the gas sack in a second gas mass flow, the second gas mass flow being smaller than the first gas mass flow.

2. The method of claim 1, wherein the closing is carried out based on a first sensor signal, which represents a first filling state of the gas sack, and the opening is carried out based on a second sensor signal, which represents a second filling state of the gas sack.

3. The method of claim 2, further comprising:
ascertaining a first gas pressure, which prevails in the gas sack, to generate the first sensor signal, and
ascertaining a second gas pressure, which prevails in the gas sack, to generate the second sensor signal.

4. The method of claim 1, wherein in the opening of the valve, the residual volume of gas is directed into the gas sack, so as to cause an increase in the depth of the gas sack in a range between 5 cm and 10 cm.

5. A device for controlling the filling of an airbag for a vehicle, comprising:
a closing mechanism to close a valve of a gas generator for the airbag situated on an interface to a gas sack of the airbag after a main volume of gas has flowed out of the gas generator, through the valve into the gas sack in a first gas mass flow; and
an opening mechanism for opening the valve to direct a residual volume of gas out of the gas generator, through the valve into the gas sack in a second gas mass flow, the second gas mass flow being smaller than the first gas mass flow.

6. An airbag system for a vehicle for protecting a person in the event of a collision of the vehicle, comprising:
an airbag, which has a gas sack and a gas generator; and
a device for controlling a filling of an airbag, wherein the device is connected to the gas generator of the airbag;
wherein the device includes:
a closing mechanism to close a valve of a gas generator for the airbag situated on an interface to a gas sack of the airbag after a main volume of gas has flowed out of the gas generator, through the valve into the gas sack in a first gas mass flow; and
an opening mechanism for opening the valve to direct a residual volume of gas out of the gas generator, through the valve into the gas sack in a second gas mass flow, the second gas mass flow being smaller than the first gas mass flow.

7. The airbag system of claim 6, further comprising:
a sensor unit connected to the gas sack and configured to supply a first sensor signal, which represents a first filling state of the gas sack, and a second sensor signal, which represents a second filling state of the gas sack, to the device.

8. A non-transitory readable medium having a computer program, which is executable by a processor, comprising:
a program code arrangement having program code for controlling a filling of an airbag for a vehicle, by performing the following:
closing a valve of a gas generator for the airbag, the valve being situated at an interface to a gas sack of the airbag after a main volume of gas has flowed out of the gas generator, through the valve into the gas sack in a first gas mass flow; and
opening the valve to direct a residual volume of gas out of the gas generator, through the valve into the gas sack in a second gas mass flow, the second gas mass flow being smaller than the first gas mass flow.

* * * * *